United States Patent
Saari et al.

(10) Patent No.: US 7,584,215 B2
(45) Date of Patent: Sep. 1, 2009

(54) USER-SPECIFIC PERSONALIZATION OF INFORMATION SERVICES

(75) Inventors: Timo Saari, Helsinki (FI); Sirkku Liukkonen, Helsinki (FI)

(73) Assignee: Helsingin Kauppakoreakoulu, Helsinki (FI)

( * ) Notice: Subject to any disclaimer, the term of this patent is extended or adjusted under 35 U.S.C. 154(b) by 1212 days.

(21) Appl. No.: 10/781,673

(22) Filed: Feb. 20, 2004

(65) Prior Publication Data

US 2004/0168190 A1 Aug. 26, 2004

Related U.S. Application Data

(63) Continuation of application No. PCT/FI02/00677, filed on Aug. 19, 2002.

(30) Foreign Application Priority Data

Aug. 20, 2001 (FI) ................................. 20011675

(51) Int. Cl.
G06F 17/30 (2006.01)
(52) U.S. Cl. ..................................... 707/104.1; 725/46
(58) Field of Classification Search ........................ None
See application file for complete search history.

(56) References Cited

U.S. PATENT DOCUMENTS

| 5,649,061 | A | 7/1997 | Smyth | |
|---|---|---|---|---|
| 6,029,195 | A | 2/2000 | Herz | |
| 6,334,127 | B1 * | 12/2001 | Bieganski et al. | 707/5 |
| 6,385,590 | B1 * | 5/2002 | Levine | 705/10 |
| 6,606,581 | B1 * | 8/2003 | Nickerson et al. | 702/186 |
| 6,934,748 | B1 * | 8/2005 | Louviere et al. | 709/224 |
| 7,370,004 | B1 * | 5/2008 | Patel et al. | 705/14 |
| 2002/0042738 | A1 * | 4/2002 | Srinivasan et al. | 705/14 |
| 2002/0065826 | A1 * | 5/2002 | Bell et al. | 707/10 |
| 2002/0104087 | A1 * | 8/2002 | Schaffer et al. | 725/46 |

(Continued)

FOREIGN PATENT DOCUMENTS

WO   WO-00/77668 A2   12/2000

OTHER PUBLICATIONS

Bogonikolos, N. Makris, C. Tsakalidis, A. Vassiliadis, B. Adapting information presentation and retrieval through usermodeling. IEEE Apr. 2001.*

(Continued)

*Primary Examiner*—Neveen Abel Jalil
(74) *Attorney, Agent, or Firm*—Birch, Stewart, Kolasch & Birch, LLP (57) ABSTRACT

A method of creating user-experiential media services in an information system including several databases for information content, users of information services, information content parameters and user profile parameters, and a rulebase for the reaction impulses of a test user group to information stimuli presented. In the system, a database descriptive of users' reactions is created. Metadata files are created for the user of the information service and the content of the information service by comparing the actual parameters descriptive of the user and the content of the information service with the theoretical parameters included in the rulebase. Possible reactions of the interaction of the user and the content of the information service are specified, whereupon the desired reaction is selected among the possible reactions. The content of the information service is modified for presentation to the user in order to achieve the desired reaction.

22 Claims, 3 Drawing Sheets

U.S. PATENT DOCUMENTS

2003/0004781 A1\* 1/2003 Mallon et al. ............... 705/10
2003/0101449 A1\* 5/2003 Bentolila et al. ............ 725/10
2004/0100507 A1\* 5/2004 Hayner et al. ............. 345/855

OTHER PUBLICATIONS

Agents in delivering personalized content based on semantic metadata. T Kurki, S Jokela, R Sulonen, M Turpeinen —Proc. 1999 AAAI Spring Symposium Workshop on Intelligent. Pub. at AAAI 1998.\*

Fink et al. A Review and Analysis of Commercial User Modeling Servers for Personalization on the World Wide Web. vol. 10, No. 2-3/ Jun. 2000.\*

De Troyer, "Audience-driven Web Design," IDEA GroupPublishing, USBN 1-878289-77-2, 2001, pp. 1-23.

Saarela et al., "Logical structure of a hypermedia newspaper," Information Processing and Management, vol. 33, No. 5, 1997, pp. 599-614.

Kahabka et al., "GRAS: An Adaptive Personalization Scheme for Hpermedia Databases," Proc. of Hypertext —Information Retrieval—Multimedia HIM, 1997, 29.9—2.10.1997, pp. 279-292.

Kurki et al., "Agents in Delivering Personalized Content Based on Semantic Metadata," Proceedings of AAAI Spring Symposium Workshop on Intelligent Agents in Cyberspace, 1999.

Anderson et al., "Personalizing Web Sites for Mobile Users," WWW10, May 1-5, 2001, Hong Kong, pp. 565-575.

Mobasher et al., "Integrating Web Usage and Content Mining for More Effective Personalization," In Proc. Of the Intl. Conf. On Ecommerce and Web Technologies (ECWeb), 2000.

\* cited by examiner

USER-SPECIFIC PERSONALIZATION OF INFORMATION SERVICES

This application is a Continuation of copending PCT International Application No. PCT/FI02/00677 filed on Aug. 19, 2002, which designated the United States, and on which priority is claimed under 35 U.S.C. § 120, the entire contents of which are hereby incorporated by reference.

FIELD OF THE INVENTION

The invention relates to information networks and particularly to user-specific personalization of information services usable via information networks.

BACKGROUND OF THE INVENTION

During the last few years, information services used and supplied via various information networks, particularly the Internet, have increased enormously. The end users of these services are provided with information on countless different topics and sources. Most information services, for example those provided via the Internet, are 'free' to the end user, i.e. the end user does not pay anything for the use of the information service, only for the telecommunication links used and, possibly, a basic fee to an Internet service provider. However, the creation and maintenance of information services provided in information networks typically cause costs to the providers of the information services in an information network, and these costs may be covered for instance by selling advertising space in association with an information service.

The enormous amount of information available on the Internet, for example, causes difficulties in finding the right information. Each end user typically has specific interests, preferences and information needs, and to find even the most important of them on the Internet is often unreasonably difficult and time-consuming. Similarly, as regards the providers of information services, it would be wise to direct each information service to end users who are interested in that specific information. This end also serves advertisers, since the ability to direct the content of an information service more exactly to an interested end user allows an advertiser to specify target groups more exactly. Consequently, the ability to easily and rapidly find and present information in the information network to an interested end user serves the ends of both the service provider and the advertiser.

Methods have been developed for this purpose, which allow the Internet home page or another similar browser page of the end user to be personalized, i.e. the information and hyperlinks comprised by the page to be modified to conform to the end user's preferences and information needs. Such methods are disclosed in e.g. WO 00/08573, EP 1065614, EP 855659, WO 99/63416, U.S. Pat. Nos. 5,790,935, 5,754,938 and DE 4440419.

A problem in these known methods is that they are based solely on quantitative information about the end user and the use history directed by the end user to a given information service. From the point of view of a provider of an information service, such quantitative information only indicates the type of information an end user is interested in, but not what the end user's reaction was and if the end user was satisfied with the information content presented and the way it was presented. Thus, a provider of an information service and an advertiser do not obtain sufficiently accurately modelled feedback about the way the content of an information service should be modified in order for the content of the information service to be as optimal as possible to all parties.

BRIEF DESCRIPTION OF THE INVENTION

The object of the invention is thus to provide a method and a device for implementing the method so as to alleviate the drawbacks in the above problems. The objects of the invention are achieved by a method and an information system, which are characterized by what is stated in the independent claims. The preferred embodiments of the invention are described in the dependent claims.

The invention is based on the information system of the invention including an information content database for storing parameters descriptive of the content of information services, a user profile database for storing parameters descriptive of the users of the information services, a rulebase including a test user group's reaction impulses to information stimuli presented, databases descriptive of an information content space and a user profile space and including theoretical alternatives for the parameters descriptive of the content and the users of the information services, and a database descriptive of a reaction space and including theoretical alternatives for parameters descriptive of the reactions of the users of the information services, the database being created as an interaction of the database descriptive of the information content space and the database descriptive of the user profile space. This interaction, in turn, is specified based on the reaction impulses defined in the rulebase.

In the method of the invention, metadata files are created for the user of an information service and for the content of the information service by comparing the actual parameters descriptive of the user and the content of the information service with the theoretical parameters based on said reaction impulses specified in the rulebase, on the basis of which any possible reactions created as a result of the interaction of said user and the content of said information service are determined based on said metadata files and the reaction impulses specified in rulebase (RB). When a user starts to browse said information service, the service provider selects the desired reaction among the possible reactions, and the content of said information service is modified for presentation to the user in such a way that the probability of the achievement of the desired reaction in the user is optimal.

In the method of the invention for creating relevant metadata files, said rulebase is essential. In accordance with a preferred embodiment of the invention, the rulebase can be created by presenting information objects that belong to an information content space and whose content and presentation are varied to a statistically significantly large test user group. Data are collected about the reactions of the test user group to the information objects, the data including at least measurement data determining vital functions of the test user group or data based on various questionnaires or behaviour. Finally, the reaction impulses of the test user group to the information objects presented are stored in the rulebase by interlinking the essential parameters of the user, the information content and the reaction.

Furthermore, in accordance with a preferred embodiment of the invention, usage data are collected on the reactions of users of the information services to the information objects presented. These collected data are used to update the parameters of the information objects included in the user profile database and the linking relations of the user, information content and reaction included in the rulebase. There is preferably some kind of feedback from the users to the information system of the invention, via which feedback data can be collected for specifying for instance a user's information interests, usage history and, preferably, measurement data specifying the vital functions of the user group, which may further include for instance data measured by sensors on the user's heart rate, epidermal sweating, blood pressure and/or facial muscle tension or data on the user's eye movement, determined by a camera.

In accordance with still another preferred embodiment of the invention, a file descriptive of the user's reactions is created based on the collected data, allowing the achievement of the desired reaction in the user to be monitored by comparing said file with the database descriptive of the reaction space based on the reaction impulses included in the rulebase.

This comparison is then used as the basis for specifying the probability of the achievement of the desired reaction, and if the desired reaction is not achieved sufficiently likely, an adaptation file is created including new specifications for information objects to be presented to the user, the specifications being used in an attempt to achieve the desired effect in the user.

An advantage of the method and system of the invention is that the metadata modelling the contents of information services, the way the content is presented, and individual users can be generated in such a manner that said metadata files enable such reactions to be caused to a user, which reactions are substantial with statistical probability. Furthermore, the method of the invention enables systematic modelling of an individual user's psychological reactions to the information presented. Another advantage of the method of the invention is that the feedback information obtained from the user allows the information presented to the user to be modified such that a favourable psychological reaction, as far as the user and/or service provider is concerned, is achieved in the user to the information content presented and to the way of presentation. Consequently, as far as a service provider is concerned, individual information services can be provided based on modelling a user's psychological reactions, which improves the user's satisfaction with said information service.

DETAILED DESCRIPTION OF THE INVENTION

Figure 1:
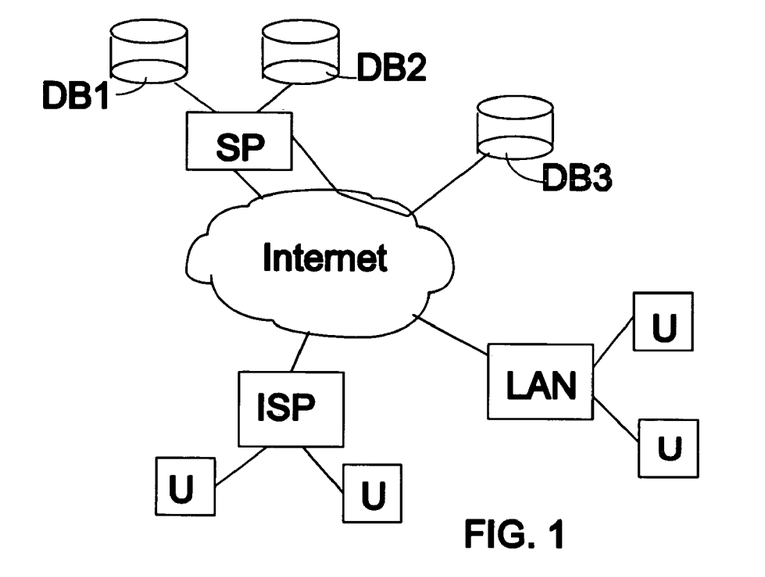
FIG. 1 shows a simplified block diagram of a prior art information system.

An example of an information system in which the method of the invention can be applied is shown with reference to FIG. 1. FIG. 1 schematically shows the Internet, to which users (U) are linked via their terminals for example via an Internet service provider (ISP) or a private local area network (LAN). A plurality of information service providers (SP) are linked to the Internet, of which FIG. 1 only shows one for the sake of clarity. An information service provider can be simply a person's home page or, at the other extreme, a large media company that provides very large amounts of information. It is preferable to store these large amounts of information in several databases (DB1, DB2), typically structured in a given manner, from which data are retrievable by means of a software application on the desired conditions. Some databases (DB3) may also be decentralized outside the service provider's information system, but said software application is, however, configured to retrieve data also in these databases. In principle, the network connecting the users and the information service provider can also be any other telecommunication network than the Internet, such as a telephone or a mobile network.

To be able to provide a user rapidly with information that interests him from this large amount of information provided by an information service provider, metadata have to be generated from the information content, i.e. information descriptive of the information content. Furthermore, to be able to adapt the information to be presented to the user in a suitable form, it is also preferable to generate information descriptive of the user, i.e. user metadata.

The method of the invention for creating metadata relevant to a user from the content of an information service is based on quantitatively measurable and qualitatively determinable parameters regarding, on the one hand, the information content, and on the other hand, the user, and on the fact that there exists a substantially determinable reaction impulse between the preset quantitative and qualitative information content and a given user profile. In other words, certain kind of people react in a given, substantially determinable manner to information presented to them, the reaction again depending on the quantitative and qualitative information content of the information to be presented.

The above substantially determinable reaction impulse is based on psychological studies, which empirically show that a psychologically significant stimulus can be used to predictably and reliably generate a given immediate and transient psychological and/or behavioural effect, the variation in said effect between different individuals being statistically predictable in relation to the variation in the stimulus. As regards reception of information, it is possible to specify, for an individual, at least an emotional effect that depends on the reactions of the autonomic and/or sympathetic/parasympathetic nervous system, a cognitive effect that depends on the efficiency of individual information processing, an experiential effect that depends on the pleasantness of the use, and effects caused by the interaction of these effects.

Variation in an effect can be determined good or bad depending on whether variation in the stimulus strengthens or weakens the effect. This reaction impulse is studied in the ATI method (Aptitude Treatment Interaction), in which different stimuli are presented to different individuals and the effect of variations in the different dimensions of the stimuli on individual effects is studied. ATI studies show that the same stimulus causes a different immediate and transient psychological and behavioural effect in different individuals, the effect being predictable substantially reliably when the properties of the stimulus relevant to create such effects are relative to individual differences, provided that said properties are adjustable with a sufficient accuracy. The ATI principle is described in detail for instance in: Riding, R. J. and Rayner, S. (1998); *"Cognitive styles and learning strategies. Understanding style differences in learning and behavior."* David Fulton Publishers, London, which describes the use of the ATI method in computer-aided teaching.

For example, when information services are used as stimuli, justifiable relevant stimulus properties may be assumed to include at least information type and the different manners to present the information. These properties can be modified to produce different effects in a user of an information service. As to the information service provider, it is thus preferable to produce positive effects to the user of the information service in such a manner that information that interests the user is presented to him in a suitable form, whereby the user is satisfied with the service obtained and prepared to use said information service also later.

According to the ATI principle, the properties of the individual, i.e. in this case the user of the information service, the properties of the stimulus, i.e. in this case the information service, and the effects generated form an interactive variable triangle; and consequently, when two values of the variable triangle are known, the third value can be predicted. An information service provider is able to determine and modify the properties of the stimulus, i.e. the information service, in various ways. Furthermore, the information service provider is able to specify to a large degree which effects the information presented is to generate in the user. Accordingly, a solution has to be found to how the properties of the information to be presented are to be modified in order for the information to be presented to generate the desired effects in a user. In other words, it should be noted that the ATI principle provides a theoretical frame of reference to how this modification should be carried out. In the following, an information system and a method are presented for providing technical means to modify information to be presented in the desired manner.

Figure 2:
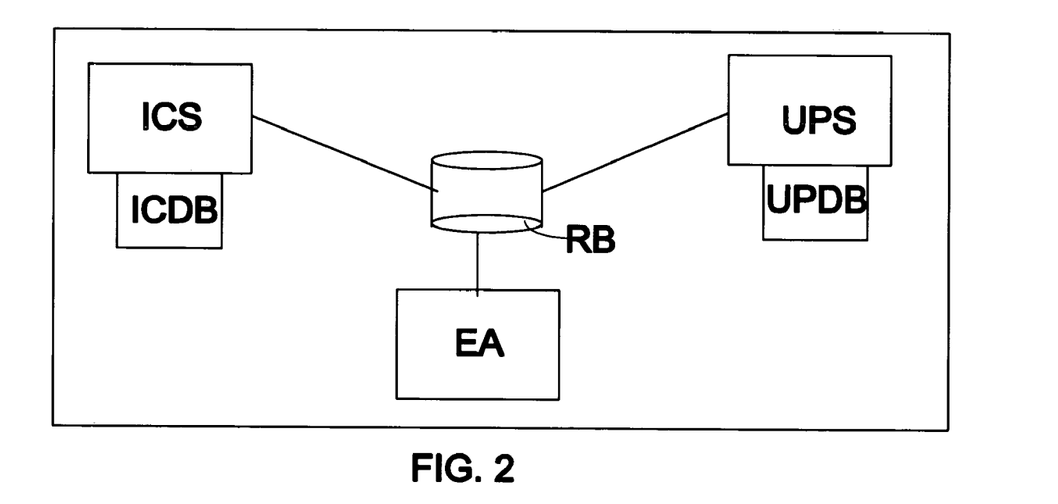
FIG. 2 shows a simplified block diagram of an information system of the invention.

The block diagram in FIG. 2 can be used to illustrate the structure of the information system of the invention. The information system comprises a database descriptive of any theoretical variation in the content of an information service or a matrix information content space ICS, which thus includes substantially all available alternatives to modify the content of the information service and the different parameters of the content. Versatile parametrization of the content of the information service to be provided is essential to the creation of relevant metadata. The content can be parametrized in various ways, but content parameters should substantially include at least some of the following categories:

content substance, which is definable quite categorically, such as 'news', which are dividable to sublevels, such as 'financial news', 'sports news', 'entertainment news', etc. In this case, parameter Substance may have n values SA (SA1 ... n).

content modality, which may be for instance text, graphics, voice, still image, video, animation or simulation. In this case, parameter Modality may have n values M (M1 ... n).

content structure, which is dividable to two parameters, i.e. content format, which specifies the visual structure of the content, such as font, location of header, use of subheads, size of viewing window, etc., and the conceptual structure of the content, which specifies for instance the size of an information block, the structural order of the information, number, length and location of overviews associated with the information etc. Parameter Format may also have n values F (F1 ... n), and, similarly, parameter Conceptual may have n values C (C1 ... n).

other parameters descriptive of the information content and expressed by parameter Other, which may also have n values O (O1 ... n).

The interaction between these parameters and their values constitute a multidimensional information content space descriptive of the content of the information service as a whole and is thus specifiable by matrix ICS, which is generated when the parameters and their values are multiplied by each other: ICS=(SA1 ... n)×(M1 ... n)×(F1 ... n)×(C1 ... n)×(O1 ... n).

Another essential matter in modelling is that an end user of an information service always has a special user profile. The user profile can also be similarly parametrized in various ways, but the user profile parameters should substantially include at least some of the following categories:

implicit user profile including e.g. the user's sex, age, education, residence and other parameters IP (IP1 ... N) implicitly describing the user. An initial implicit user profile can be created for instance by means of an inquiry in a registration form, and this user profile can be later specified as the user uses an information service over time.

explicit user profile including explicit parameters EP (EP1 ... n), which are generated on the basis of given rules or assumptions based on the parameters that implicitly specify the user and which are generated under the assumption that users of a given sex, age, education and residence stereotypically search for certain type of information, information interest profile including parameters IIP (IIP1 ... n) indicating the information categories the user is interested in. These parameters IIP may greatly correspond to the information content substance parameters SA. An information interest profile can also be preliminarily specified by means of an inquiry in the service registration form, and the information interest profile may also be later specified as the user uses an information service over time.

usage history profile including history parameters HP (HP1 ... n) specifying the user's previous uses of the information service, such as time used for browsing the information service, interval between instances of use, information categories browsed, and other quantitative parameters, collaborative filtering profile, allowing new parameters CP (CP1 ... n) to be specified for a user for instance by combining the above profiles and then filtering according to given rules, for example information category-specifically, and other parameters descriptive of the user profile, which may also have n values OP (OP1 ... n).

The interaction between these parameters and their values generate a multidimensional user profile space descriptive of the users of an information service as a whole and definable by matrix UPS, which forms when the parameters and their values are multiplied by each other: UPS=(IP1 ... n)×(EP1 ... n)×(IIP1 ... n)×(HP1 ... n)×(CP1 ... n)×(OP1 ... n). The user profile space is stored in the database UPS comprised by the information system.

The interaction of the information content space and the user profile space, i.e. multiplying matrices ICS and UPS by each other, generates generic information about the effect to be created, i.e. an effect space, which can be modelled by the matrix generated EA=ICS×UPS.

Said three matrices thus include generic information, i.e. theoretically all alternatives regarding the information service content and content variations, users and user variations, and the effects generated from the interaction of these and their variations.

A reference model, which is empirically proven good and called rulebase RB in this context, is required to determine the probabilities for the different combinations of content, users and the effects generated as their interaction from all these theoretically feasible alternatives. The rulebase RB thus specifies the above interaction, i.e. the interaction between the values of the information content space, the user profile space and the effect space. The rulebase RB thus acts as an 'algorithm' for the variable triangle, allowing the third factor to be determined when the other two factors are known.

The rulebase RB is preferably generated before the system is taken into use in such a manner that actual test users are presented different information by varying the content and presentation of the information, whereby the reactions of these test users to the information presented is measured simultaneously by different methods. Different methods can be used to measure the reactions, for instance by means of sensors coupled to the test users and measuring different vital functions, such as heart rate, electrodermal activity, blood pressure or facial muscle tension. Sensors can be coupled to different parts of the bodies of the test users, or the sensor(s) can be integrated for instance into a mouse of a computer. Methods are also known for determining the reactions of test users by means of a camera that monitors the eye movements of the user. The reactions of test users may also be determined statistically reliably by means of different interviews, questionnaires and methods based on observing the behaviour of the user. Various methods of measuring vital functions and reactions are known per se to a person skilled in the art and are disclosed for example in U.S. Pat. Nos. 5,649,061, 4,883,067, 5,377,100 and 5,409,445. The actual method used to measure the reactions of the test users is not essential to the implementation of the invention, it is more essential that the number of test users used to generate the rulebase RB is sufficient to enable the determination of statistically sufficiently accurate probabilities for the different combinations of content, users and the effects generated as their interaction. The sufficient number of test users for this purpose is substantially at least several hundreds of test users.

The information system further comprises a user profile database UPDB including information about the actual users of an information service. A user file is preferably created for each user in the database UPDB and it includes the user's profile having given parameters and user-specific values for these parameters. The parameters of the user's profile preferably include as many parameters as possible used in the determination of the user profile space UPS, i.e. implicit user profile, explicit user profile, information interest profile, use history profile, collaborative filtering profile and other parameters descriptive of the user profile. The user profile database UPDB is preferably structured as similar as possible to the user profile space UPS. In addition, information about the information the user consumes is stored in the user file: information content, specified by content parameters that preferably correspond as far as possible to the parameters used in the determination of the information content space ICS. User-specific values for all the profile and information content parameters definable for a user are stored in the user file.

These parameters and their values are updated as the parameter values change and new parameters are determined. It is thus clear that when a user starts to use an information service for the first time, the number of profile and information content parameters is still relatively low and the parameter values are not necessarily yet fixed. However, after a reasonable time of use, new parameters can be determined for the user and the parameter values specified, whereby the user profile is rapidly specified.

An initial user profile may also be determined for a user in advance for instance by means of an inquiry in a registration form. At least an initial implicit user profile and information interest profile can be generated based on the inquiry and be later specified along with the user's instances of use. The user may also be subjected to a test of a type corresponding to that of the above-described test users, allowing the reactions of the user to the different information content and information presentation to be stored in the user file.

The information system also includes an information content database ICDB including actual content objects of an information service, which may concretely be located in several different databases. The information content database ICDB is preferably structured as similar as possible to the information content space ICS.

All above databases and the information therein can be preferably structured so that the comparison and interaction of the information elements included in the databases is made as flexible as possible for the generation of the metadata required in the personalization. It is evident to a person skilled in the art that the databases can be structured in various ways, enabling the optimization of the structuring supportive of the generation of metadata to be carried out in various ways. The concrete implementation of the above databases is not either essential to the invention, allowing them to be physically suitably integrated or totally separate.

In accordance with a preferred embodiment of the invention, the information elements comprised by the information system can be coded as XML documents (Extensible Markup Language), which facilitates the structuring of the database parameters. When structured content documents are generated, the information to be collected in the content document can be arranged in accordance with a predetermined document type description DTD. The DTD determines the tags used in the XML language, the structural relations between the inter-tag elements (!ELEMENT) and other specifications used in the XML documents. As is well known in the XML language, an element starts with an initial identifier (e.g. <section>) and ends in an end identifier (</section>) and may include text or other elements. However, DTD is not necessary in valid content documents, as long as the elements to be processed are determined in the application processing the content document.

To enable further processing, the parameter values are categorized in a content document based on information elements, e.g. an element can be determined in the DTD for each information element, typically specifying several parameter values. The number of parameter values comprised by a system is usually very high, whereby several content documents are generated in the system for the different parameter entities to be monitored. Typically, parameter values are collected, XML content documents are generated/stored and compared in a workstation WS including one or more applications. The workstation WS preferably includes an XML browser application for presenting XML content documents at a user interface UI to an operator managing the system of the service provider.

The XML language cannot be used to determine the appearance of the content document (or difference document), i.e. the styles in accordance with which the content document is visible on the display of the user's or operator's workstation WS. The appearance can be specified for different terminals and workstations by using the XSL (Extended Style sheet Language). Thus, the XSL is a presentation language for XML documents and consists of two parts: modifications of XML documents and formatting dictionaries. In accordance with a preferred embodiment, the XML content document comprises a style sheet according to the XSL language for the appearance of the content document. Other style sheets may also be used, such as CSS style sheets (Cascading Style Sheet).

A style sheet may specify the manner of presentation of information in a document, such as presentation order and/or appearance. Different style sheets can be used for different information elements, their parameters and parameter values. In this case, the application modifies the data to be retrieved from databases in a form specified suitable for the user preferably by changing the XSL style sheet. In accordance with a preferred embodiment of the invention, the XSL style sheet includes instructions according to which XML-form data can be converted into the HTML format. In this case, the content document or the difference document can also be displayed in devices only having an HTML browser, which is typical when an information service is used for instance via the Internet. A content document edited according to a style sheet usually contains text, hypertext, graphic data or references to graphic data images, audio, video and other content. It may also include links to other files. As attachments to content documents, programs may be loaded to users' terminals, such as Java™ applet applications or Microsoft™ ActiveX applications, which may carry out the above processing of content documents.

As to the service provider, it is essential to the generation of useful metadata that the service provider tends to model each user in the variable triangle formed from the information to be displayed, the user and the user's reactions in order to provide the user with suitable desired effects by changing the content and presentation of the information. Typically, a service provider knows what kind of effects to preferably provide, and, on the other hand, the service provider is able to affect only the content and presentation of the information.

The metadata required in the personalization are generated by means of software, which first retrieves matrix UPS, descriptive of the user profile space, and its values from a database. The software then retrieves the profile file Profile1 concerning the user to be personalized, such as User1, from the user database UPDB, which profile is then compared with the parameters and parameter values in matrix UPS. The parameters of profile file Profile1 are placed onto the corresponding parameters in matrix UPS, and the correspondence of the parameters and their values is then studied. The file User1Meta-data generated from this comparison includes information about the generic user category User1 belongs to. Since the interaction of the user profile space UPS with the information content space ICS and the effect space EA is determined based on the rulebase RB, regularities for the information content and the effects created can be derived from the file User1Metadata specifying the generic user category of User1 by means of an algorithm generated by the rulebase RB.

Similarly, the software generates a metadata structure for the content of the information service. The software first retrieves matrix ICS, descriptive of the information content space, from the database and stores it in a memory as file InformationStructure. The software then goes through the content of the information service from the content database ICDB, based on which an interpretation of the structure of the content database is made, i.e. file ContentInterpretation. This file includes information about the rules based on which the software made its interpretation, and information about the information content object category with which each particular interpretation is associated. File ContentInterpretation further includes linking addresses to the different information objects in the content database ICDB. Thus file ContentInterpretation includes as rich metadata as possible about the content of the information service, allowing it to be utilized as efficiently as possible in further processing of the information. The correspondence of the parameters and their values in the two files, InformationStructure and ContentInterpretation, is studied. A third file, AdjustedContentInformationStructure, is created from this comparison.

The above interpretations of the comparison of the content in different databases can be made for instance by using different known analysis and machine learning methods, including for instance methods based on self-organizing neural networks or what is known as the Bayes method. Any method can be used in the interpretation, provided the method allows the system to first generate a machine-language description about the different databases and then compare the descriptions of the databases with each other. The system then infers by means of for instance neural networks or the Bayes method how well these descriptions correspond to each other and generates, based on this inference, a new file including the result of the inference and usable in further processing.

The software then links, by means of the information content object link data in file ContentInterpretation, the data in file AdjustedContentInformationStructure with the content objects in the content database ICDB. From this linking a fourth file is created, ContentMetadata, which includes the data of file AdjustedContentInformationStructure and link data descriptive of the content objects of the content database ICDB, their parameters and parameter values described in file AdjustedContentInformationStructure. In other words, ContentMetadata is a file descriptive of the metadata structure of the content of the information service, in whose generation different effects caused to users are taken into account because the interaction of the information content space ICS with the user profile space UPS and the effect space EA is determined based on the rulebase RB.

In other words, the algorithm the software implements in the above comparison of the parameters and their values is based on the ATI principle such that the effect generated by the interaction between the content and its way of presentation and the user's Profile1 is determined as the basis of the algorithm, whereby this entity forms an interactive total variable stored in the rulebase RB. The algorithm is derived based on the content of the rulebase RB, whereby the algorithm serves to generate predictions based on statistical probability and based on the fact that the content and its ways of presentation, the user profile and the achieved effects form a variable triangle whose mutual reaction impulses are specified and stored in the rulebase RB. In this case, if the content of the information and its way of presentation and desired effect are known, at least some parts of the user profile can be specified. Similarly, if the user profile and the desired effect are known, a suitable information content and its way of presentation can be inferred. Further, if the user profile and information content and presentation are known, the effect achieved can be inferred.

Figure 3:
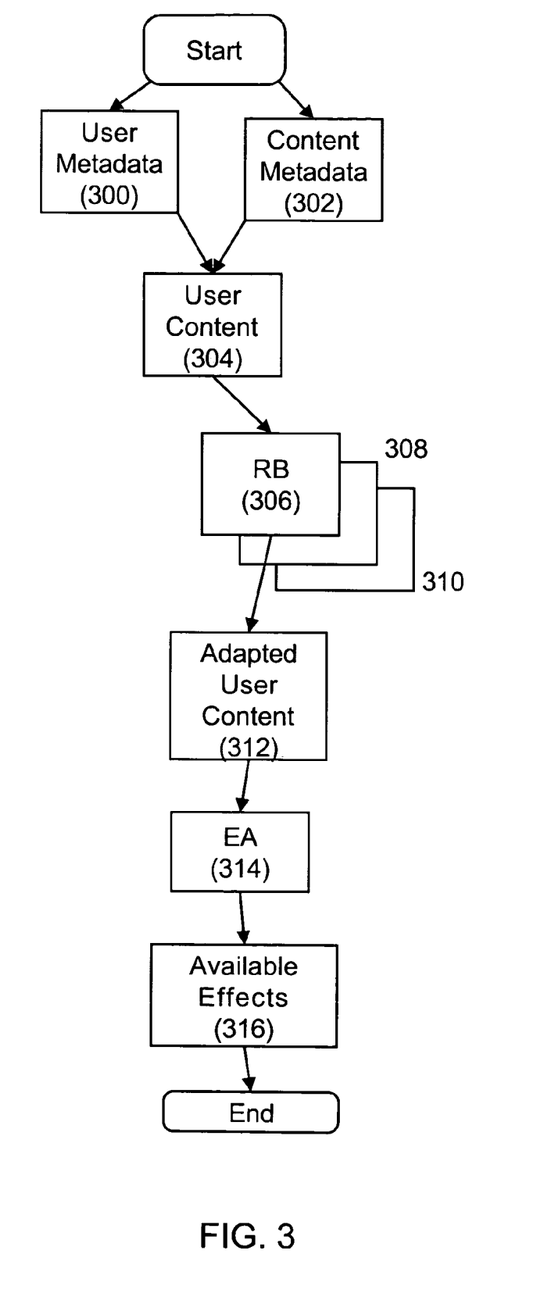
FIG. 3 is a flow diagram of creating metadata specifying a user profile.

The software creates an information service-specific effect space, which is a group of the transient and immediate effects possible for a given information service having a given user group; i.e. a subset of the effect space EA specified above. The creation of the information service-specific effect space by means of the software will be illustrated next with reference to FIG. 3. The software first combines files UserMetadata (300) and ContentMetadata (302), creating an interaction matrix UserContent (304). Using known methods and the interaction information in the rulebase RB (306), the data in matrix UserContent are then compared with the generic user profile space UPS (308) and the information content space ICS (310), and an analogy matrix AdaptedUserContent (312) is created based on the comparison. Finally, the software compares matrix AdaptedUserContent with the previously specified generic effect space EA (314) and infers their correlation, and as a result matrix AvailableEffects (316) is created, which is thus descriptive of the set of transient and immediate effects that can be achieved by a given information service content selection and a given user group.

An embodiment of the software of the invention includes program procedures, generally called ModifyingTool. This tool enables the visualization of matrix AvailableEffects such that its parameters and their values take a shape that is understandable to the user of the software. Furthermore, this tool enables the creation of rules based on matrix AvailableEffects that relate to the desired effects relative to any database object, such as the information content, the way of presentation of the content, the user or the user group. Said tool can also be used to store these rules in a ReadyEffect rulebase including the created rules and their reference points, i.e. objects or users to which they are linked.

In addition, this tool can be used to utilize said ReadyEffect rulebase when personalizing the supply of an information service to users, the personalization being based on the utilization of transient effects. The tool provides at least four different embodiments for user-specific modification of an information service.

In accordance with a first embodiment, the desired effect can be specified for a given information object, such as the content or the way of presentation of given information. Accordingly, for example a news service can be modified in such a way that, among the content objects, Ad1 is specified as linkable thereto, to which Effect1 is always desired (for instance maximal persuasiveness) in each user. In this case, for instance the following facts, specifying the rule, can be specified for Effect1: effect dimension (emotional, cognitive, experiential), intensity, probability, priority, interaction between effects (strengthening/weakening), quality, ATI type (good/poor compatibility). ModifyingTool links this rule to database object Ad1. Changes in user effects are achieved by varying the content substance and the way of presentation. In this case, parameters are varied that affect the way of presentation of the content, such as modality, conceptual structure or format. This parameter set can be called parameter Z, which is varied automatically always when Ad1 is shown to the user. When Ad1 is shown to User1, the system searches AvailableEffects matrix for those parameters Z1 to Zn for the way of presentation of the content that can be used to provide User1 with an effect that corresponds optimally to the desired effect. The system thus always tries to find the optimal compatibility between the desired effect and the effects achieved by the available parameters Z.

In accordance with a second embodiment, the desired effect can be specified for several information objects. This is usable when the intention is to create a category of information objects, with which a given effect is to be achieved in all users. For example a provider of a financial news service may want to specify Effect2 (e.g. maximal efficiency of information processing) for the ten daily most important headlines. The variables specifying the effect rule may correspond here to those of the first embodiment. ModifyingTool links this rule to database objects News1 . . . 10. The system modifies the way of presentation of News1 . . . 10 relative to the individual differences between User1 . . . n in such a way that the desired effect is achieved optimally.

In accordance with a third embodiment, the desired effect can be specified for one user. In this case, for instance the provider of a news service wants to provide a given individual, for instance a new client, with a given effect Effect3 (for instance pleasantness of experience of use) using the above principles, which effect is to be achieved in the user with each object of the information service. In this case, when the client uses the information service, the system modifies the content and the way of presentation of the content such that all information objects browsed by the user would optimally achieve Effect3. Also in this embodiment, the system always tends to find the optimal compatibility between the desired effect and the available effects achieved by the parameters descriptive of the information content.

In accordance with a fourth embodiment, the desired effect can be specified simultaneously for several users. This embodiment is identical to the previous embodiment except that at first a user set is specified that is a segment of the entire user group, e.g. men. The desired effect is then specified for this segmented set and the content and the way of presentation of the information to be browsed is then modified such that the desired effect is optimally achieved in the entire segment. Herein, the information to be presented is thus modified user-specifically in order to achieve the same desired effect in said entire segment, such as men.

Figure 4:
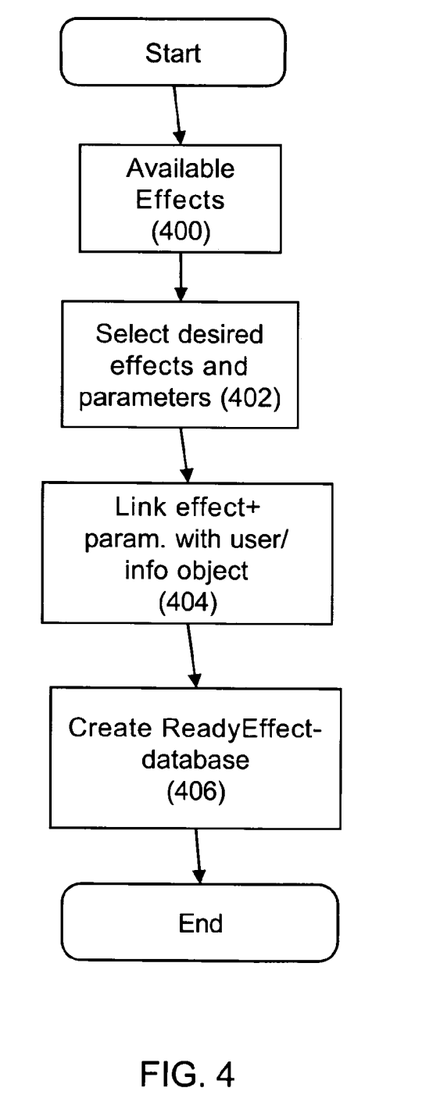
FIG. 4 is a flow diagram of linking the desired reactions to information content objects and users.

The above embodiments may naturally be combined in several ways, the intention being to achieve several different effects simultaneously in several different user groups. The operation of the ModifyingTool software is next described generally with reference to FIG. 4. The software first studies the effects available in AvailableEffects matrix (400) for a given information object. The desired effect is then selected and different parameters (402) are specified for the effect. The software links this effect and the specifications of its parameters to the selected information object and/or users (404). The relations stored in ReadyEffect rulebase (406) are then used to derive the format of the content substance and the way of presentation corresponding to a given user/user group and the desired effect, with which the optimal compatibility is achieved between the desired effect and the available effects achieved by the parameters specifying the information content.

The software of the invention further includes program procedures which allow a user's operation to be monitored preferably starting when the user is shown the first page of the information service. This program or program procedures may be called EffectFollowUp software. The operation of the EffectFollowUp software is based on the follow-up of the reactions achieved by the information presented to the user, and a file EffectProfile is created for each user based on these reactions.

EffectProfile is a parameter file, in which information on all information objects with which the user has interacted when visiting the information service, and the parameters of these information objects, are accumulated. In addition, information about the above-described effects with which the user interacted when visiting the information service, and the parameters of these effects, are accumulated in the EffectProfile file. Furthermore, real-time follow-up information preferably about how long the user stayed in touch with each information object and effect, respectively, and what the state of the user's nervous system, body movements and gestures were, measured by some known method, are stored in the EffectProfile file. All these parameters can be called EffectData, all possible values of all parameters of which are descriptive of the above effect space EA. The EffectProfile file is thus a user-specific subset of the effect space EA and includes EffectData parameters and their values.

Accordingly, it is essential to the creation of EffectData that there is at least one, preferably several feedbacks from users to a service provider's information system, the feedbacks transferring information about the user's effects. At its simplest, the feedback is quantitative usage history and time data associated with information objects and used as the basis for evaluating a user's effects. However, significantly more reliable qualitative information about a user's effects is obtained by measuring the state of the user's body and nervous system during usage by different methods. This measurement may be based on for instance sensors measuring electrodermal activity, based on which different types of activities of the nervous system are measured, or on a camera determining eye movements and changes occurring in the eye, from whose picture measurement data are derived by means of computer vision software. Measurement data may also be generated for instance from bodily positions, gestures and expressions and their variation as a function of time or bodily secretion, such as sweating, carbon dioxide content in exhalation etc. Furthermore, the user may be presented questionnaires during usage or other queries displayed on the screen (known as a dialog box). It is preferable for the reliability of the information and the compatibility with the rulebase RB that the methods used in the measurement are substantially compatible with the methods used in specifying the rulebase for the test user group.

Since the interaction of the effect space EA to the information content space ICS and the user profile space UPS is determined based on the rulebase RB, the effects achieved in a user and the file EffectProfile determining this can be used to derive regularities for the information content and the generic user category by means of an algorithm generated by the rulebase RB. The above-described effect information obtained via feedback can be used to determine if the desired effect is achieved, how long the effect will last, what the quality of the effect is (e.g. depth), etc. by means of the rulebase and known methods measuring human activity, such as psychophysiology, eye movement study, bodily movement study or brain scan. This EffectData is stored in the user's EffectProfile file real-time during the user's session.

Furthermore, during usage, these data in the EffectProfile file are input in a program procedure that can be called EffectFollowUpProgram. The EffectFollowUpProgram compares these parameters in the EffectProfile file with the general parameters in the effect space EA, and determines, based on the data comprised by the rulebase RB, if the effect desired by the service provider is achieved. The achievement of the desired effect is determined in such a way that at first there exists a group of determined desired effects for each information object or user. These are stored in the ReadyEffect rulebase. Secondly, the achievement of the effect can be monitored based on the feedback information obtained from the user in the above-described manners, based on which the user's EffectProfile file is modified. Thirdly, the rulebase RB includes generic interaction information about how a generic user (i.e. the user profile space UPS) generates a generic effect (effect space EA) in response to the presented generic information (information content space ICS).

Based on this information and utilizing the interaction relation specified by the rulebase RB, the probability of the achievement of a given desired effect can be specified from the EffectData information processed at each particular time. In other words, the EffectFollowUpProgram specifies, based on each particular piece of EffectData information, the probability of the achievement of a given effect, EffectN, in a given user, UserN. The software then specifies the adaptation required for the information to be presented to the user. If the probability of the achievement of the desired effect is sufficient, the system settings do not have to be changed. If again the probability is not sufficient, an Adaptation file is created, which includes all possible displayable variations of the information object to be presented next to achieve the desired effect.

The desired effect may remain the same (EffectN) or it may be some other effect (EffectN+1). If the desired effect remains the same, the EffectFollowUpProgram creates a specification, based on the AvailableEffects matrix and the EffectData information, according to which the content or the way of presentation of the content of the information to be presented is to be modified in order to achieve EffectN most probably. This specification constitutes a file PredictedAdaptation. If again the desired effect (EffectN+1) changes from the previous effect (EffectN), the PredictedAdaptation file is specified in the above manner utilizing the ReadyEffect rulebase and the interaction specifications included in the rulebase RB. Adaptation adjustment is carried out as a separate program procedure that can be called an AdaptationAdjustment program. If the desired effect changes back to a previously processed effect (EffectN), the software preferably utilizes this information, whereby, if the probability of the achievement of said effect was not sufficient previously, an attempt is made to achieve said effect using the adapted way of presentation of the information. The AdaptationAdjustment program answers for the information object to be presented to the user next and its content, which the program specifies by utilizing the ReadyEffect rulebase and the PredictedAdaptation file, the information comprised by which being modified in accordance with the interaction specifications included in the rulebase RB.

Figure 5:
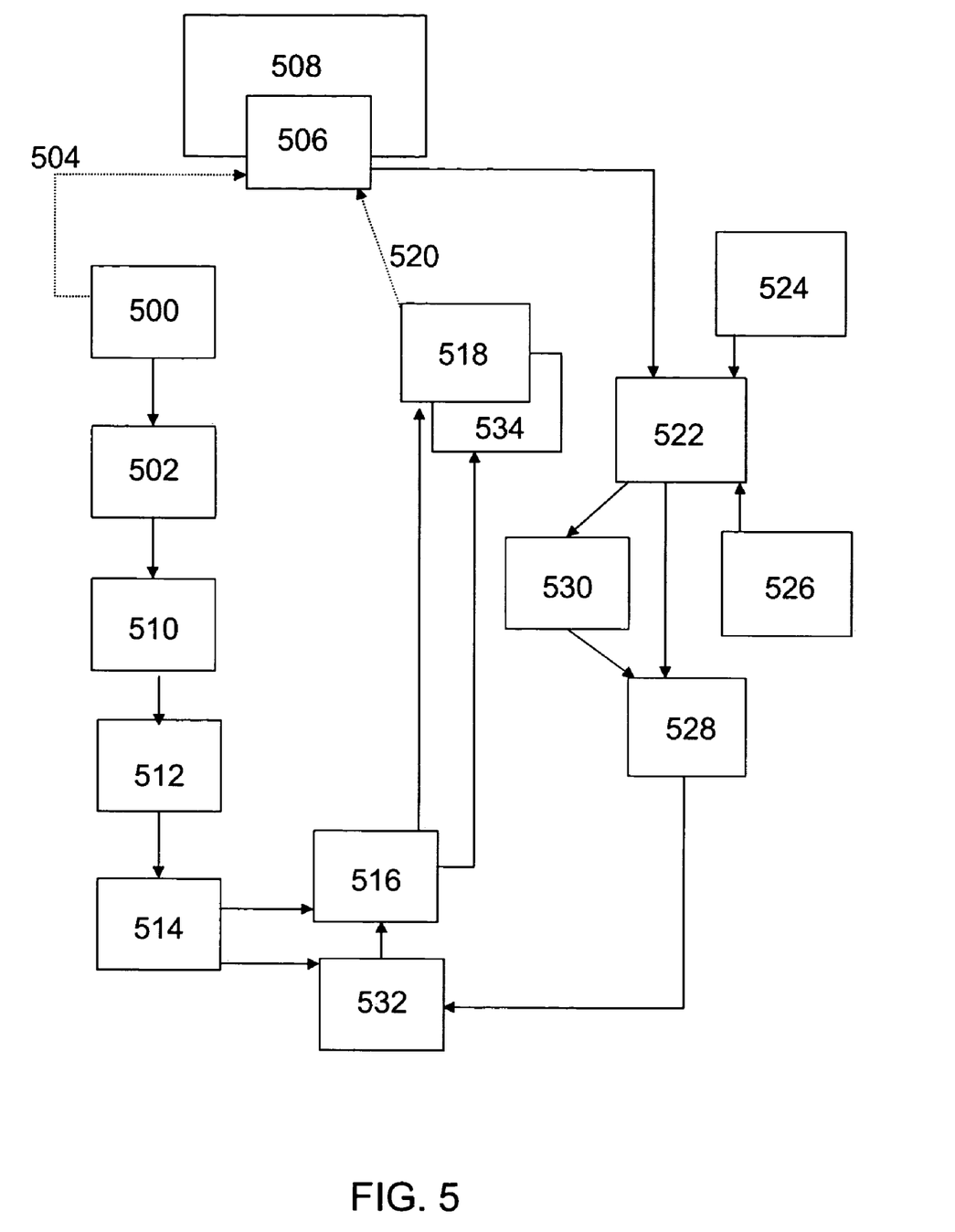
FIG. 5 is a block diagram of the method of the invention for achieving the desired reactions in a user.

The execution of the above-described software is illustrated next with reference to FIG. 5. When the user (500) tries to start to use an information service for the first time, the user is first identified and, if need be, authenticated (502). Measurement data (504) are preferably obtained from the user and the user's body during usage, and the measurement data and the parameters of the information objects the user browses are used to create the file EffectProfile (506) for the user, which is thus a user-specific subset of the effect space EA, including EffectData parameters and their values (508).

The user next requests for a given information object for presentation (510), whereby the software specifies the desired effect for said information object (512). The software retrieves the user-specific specifications associated with the desired effect from the ReadyEffect rulebase (514), based on which the parameters according to the specifications are retrieved from the content database ICDB for said information object (516), and the information object is presented to the user in accordance with the specifications (518). Feedback (520) is further derived from the user's browsing data and usage history, from which the user's EffectData during the session is updated in real time in the user's EffectProfile file.

Furthermore, these data in the EffectProfile file are input in the EffectFollowUpProgram (522). The EffectFollowUpProgram compares these parameters of the EffectProfile file with the general parameters in the effect space EA (524) and determines, based on the data included in the rulebase RB (526), if the effect desired by the service provider is achieved. This enables the probability of the achievement of a given desired effect in a user to be determined from each particular piece of EffectData information being processed. The achievement of an effect can be estimated by comparing the obtained probability prediction with a preset limit value. The software then determines the adaptation required for the information to be presented to the user. If said probability of the achievement of the desired effect is sufficient, systems settings do not have to be changed. If said probability of the achievement of the desired effect is insufficient, an Adaptation file (528) is created, including all possible presentable variations of the information object to be presented next to achieve the desired effect.

If the desired effect remains the same, the PredictedAdaptation file (528) is created based on the AvailableEffects matrix (530) and the EffectData data (508), whereby the file includes a specification regarding how the content or the way of presentation of the content of the information to be presented has to be modified in order to achieve the desired effect most probably. If again the desired effect changes from the previous effect, the PredictedAdaptation file (528) is specified in the above-described manner utilizing the ReadyEffect rulebase (514) and the interaction specifications included in the rulebase RB (526). Adaptation adjustment is carried out as a special program procedure by means of the AdaptationAdjustment program (532). The AdaptationAdjustment program draws up modifying specifications for the information object and its content (534) to be presented to the user next, in which specification the software utilizes the ReadyEffect rulebase and the PredictedAdaptation file, the information contained by which is modified in accordance with the interaction specifications included in the rulebase RB.

Figure 6:
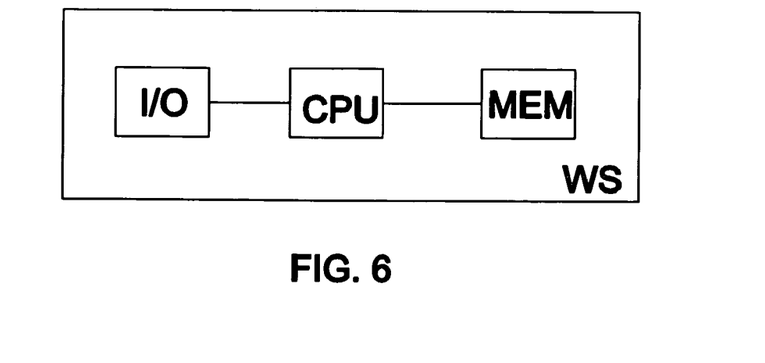
FIG. 6 is a block diagram of means used in implementing the invention.

One or more programs executed in a processor can implement the primary embodiment of the present invention. In accordance with FIG. 6, the workstation WS comprises at least one processor CPU, I/O means I/O and memory MEM for executing computer program code for implementing the functions illustrated in FIGS. 3, 4 and 5. The computer program code can be stored in an internal memory MEM or in a separate memory means read by the computer, e.g. a diskette, a hard disk or a CD/DVD-ROM disk. Integrated circuits IC can also be used to implement the invention.

It should be noted that although an embodiment of the invention describes XML-based documents, the invention is not restricted to the use of the XML language, but content documents may be specified in the format determined by any other structural language. A proprietary solution may also be used, which does not, however, achieve the compatibility provided by the XML.

It is obvious to a person skilled in the art that as technology advances, the basic idea of the invention can be implemented in a variety of ways. The invention and its embodiments are thus not limited to the above examples, but may vary within the claims.

The invention claimed is:

1. A method of creating user-experiential media services in an information system including an information content database, in which parameters descriptive of the content of information services are arranged to be stored, and a user profile database, in which parameters descriptive of users of the information services are arranged to be stored, the method:

creating a rulebase including a test user group's reaction impulses to information stimuli presented;

creating databases descriptive of an information content space and a user profile space and including theoretical alternatives for the parameters descriptive of the content and the users of the information services;

creating a database descriptive of a reaction space including theoretical alternatives for parameters descriptive of the reactions of the users of the information services, the database being created as an interaction of the database descriptive of the information content space and the database descriptive of the user profile space, the interaction being specified based on the reaction impulses defined in the rulebase;

creating metadata files for at least one user of the information service and for at least one content of the information service by comparing the actual parameters descriptive of said user and said content of the information service with the theoretical parameters based on said reaction impulses specified in the rulebase;

determining any possible reactions created as a result of the interaction of said user and said content of the information service based on said metadata files and the reaction impulses specified in the rulebase;

selecting the desired reaction among said possible reactions;

in response to the user starting to browse said information service, modifying the content of said information service for presentation to the user to provide an optimal probability of the creation of the desired reaction in the user;

collecting data during the use on the reactions of the users of the information services to the information objects presented;

creating a file descriptive of the user's reactions based on said data;

monitoring the achievement of the desired reaction in the user by comparing said file with the database descriptive of the reaction space, based on the reaction impulses included in the rulebase; and determining the probability of the achievement of the desired reaction based on said comparison.

2. The method as claimed in claim 1, wherein said rulebase is created by presenting information objects, which belong to the information content space and whose content and presentation are varied, to a statistically significantly large test user group;

collecting data on the reactions of the test user group to said information objects; and storing the reaction impulses of the test user group to the presented information objects in the rulebase by linking together the essential parameters of the user, the information content and the reaction.

3. The method as claimed in claim 2, wherein said measurement data specifying the reactions of the test user group includes at least some of the following:

data measured by sensors on a user's heart rate, epidermal sweating, blood pressure and/or facial muscle tension;

data determined by a camera on the user's eye movements;

data based on questionnaires, interviews or observation of behaviour.

4. The method as claimed in claim 1, further comprising specifying said possible reactions by combining the metadata file descriptive of the user and the metadata file descriptive of said information service;

comparing the combined metadata file with the databases descriptive of the user profile space and the information content space based on the reaction impulses included in the rulebase; and correlating the file created as a result of said comparison to the database descriptive of the reaction space.

5. The method as claimed in claim 4, further comprising creating a set of desired reactions out of the set of said possible reactions;

creating a file for each desired reaction, including linking data for the interaction between each user and each information service content object as specified by the rulebase; and in response to the user starting to browse said information service, modifying the content of said information service for presentation to the user based on said file by deriving the content of the information service to be presented to the user from the desired reaction.

6. The method as claimed in claim 1, further comprising
updating the parameters of the information objects included in said user profile database based on the collected data; and
updating the linking relations of the user, information content and reaction included in the rulebase based on the collected data.

7. The method as claimed in claim 1, wherein said data includes at least one of the following:
information interest data;
usage history data;
measurement data specifying the users' vital functions, which further include at least one of the following:
data measured by sensors on the user's heart rate, epidermal sweating, blood pressure and/or facial muscle tension;
data on the user's eye movement, determined by a camera;
data collected by means of questionnaires presented during usage.

8. The method as claimed in claim 1, further comprising
in response to the probability of the achievement of the desired reaction being lower than a preset limit value and the desired effect does not change;
comparing the file descriptive of the user's reactions with said set of possible reactions, based on the reaction impulses included in the rulebase; and
as a result of said comparison, creating an adaptation file including content parameters of the information object to be presented next to the user, the parameters being specified to increase the probability of the achievement of the desired effect.

9. The method as claimed in claim 1, further comprising
in response to the probability of the achievement of the desired reaction being lower than a preset limit value and the desired effect changes;
retrieving the file of the desired reaction from the database, the file including linking data for the interaction between each user and each information service content object as specified by the rulebase; and
modifying the content of said information service for presentation to the user based on said file by deriving the content of the information service to be presented to the user from the desired reaction.

10. The method as claimed in claim 1, further comprising
coding the information objects included in said information system as XML documents.

11. The method as claimed in claim 10, wherein
said XML documents including a style sheet, such as an XSL style sheet for the appearance of an XML content document, the style sheet including instructions for converting the data included in an XML content document into an HTML document.

12. A computer system including:
a processor;
a memory, comprising:
a computer-readable information content database, in which parameters descriptive of the content of information services are arranged to be stored;
a computer-readable user profile database, in which parameters descriptive of the users of information services are arranged to be stored;
a computer-readable rulebase, in which the reaction impulses of a test user group to information stimuli presented are arranged to be stored;
a computer-readable database descriptive of an information content space and a user profile space and including theoretical alternatives for the parameters descriptive of the content of the information services;
a computer readable database descriptive of a reaction space and including theoretical alterative for parameters descriptive of the reactions of the users of the information services, the database being created as an interaction of the database descriptive of the information content space and the database descriptive of the user profile space, the interaction being specified based on the reaction impulses defined in the rulebase;
in which computer system metadata files are arranged to be created for at least one user of the information service and for at least one content of the information service by comparing the actual parameters descriptive of said user and said content of the information service with the theoretical parameters based on said reaction impulses specified in the rulebase;
any possible reactions created as a result of the interaction of said user and said content of the information service are arranged to be specified based on said metadata files and the reaction impulses specified in the rulebase;
the desired reaction is arranged to be selected among said possible reactions; and in response to the user starting to browse said information service, the content of said information service is arranged to be modified for presentation to the user to provide an optimal probability of the creation of the desired reaction in the user;
data are arranged to be collected during the use on the reactions of the users of the information services to the information objects presented;
a file descriptive of the user's reactions is arranged to be created based on said data; the achievement of the desired reaction in the user is arranged to be monitored by comparing said file with the database descriptive of the reaction space, based on the reaction impulses included in the rulebase; and
the probability of the achievement of the desired reaction is arranged to be determined based on said comparison.

13. The computer system as claimed in claim 12, wherein said rulebase is arranged to be created by
arranging information objects, which belong to the information content space and whose content and ways of presentation are varied, to be presented to a statistically significantly large test user group;
arranging data to be collected on the reactions of the test user group to said information objects; and
arranging the reaction impulses of the test user group to the presented information objects to be stored in the rulebase by linking together the essential parameters of the user, the information content and the reaction.

14. The computer system as claimed in claim 13, wherein said measurement data specifying the reactions of the test user group includes at least some of the following:
data measured by sensors on a user's heart rate, epidermal sweating, blood pressure and/or facial muscle tension;
data determined by a camera on the user's eye movements;
data based on questionnaires, interviews or observation of behaviour.

15. The computer system as claimed in claim 12, wherein said possible reactions are arranged to be specified such that the metadata file descriptive of the user is arranged to be combined with the metadata file descriptive of said information service;

the combined metadata file is arranged to be compared with the databases descriptive of the user profile space and the information content space based on the reaction impulses specified in the rulebase; and the file created as a result of said comparison is arranged to be correlated to the database descriptive of the reaction space.

16. The computer system as claimed in claim 15, wherein a set of desired reactions is arranged to be created out of the set of said possible reactions;

a file is arranged to be created for each desired reaction, including linking data for the interaction between each user and each information service content object as specified by the rulebase; and in response to the user starting to browse said information service, the content of said information service is arranged to be created for presentation to the user based on said file by deriving the content of the information service to be presented to the user from the desired reaction.

17. The computer system as claimed in claim 12, wherein the parameters of the information objects included in said user profile database are arranged to be updated based on the collected data; and the linking relations of the user, information content and reaction included in the rulebase are arranged to be updated based on the collected data.

18. The computer system as claimed in claim 17, wherein said data includes at least one of the following:

information interest data;

usage history data;

measurement data specifying the users' vital functions, which further include at least one of the following:

data measured by sensors on the user's heart rate, epidermal sweating, blood pressure and/or facial muscle tension;

data on the user's eye movement, determined by a camera;

data collected by means of questionnaires presented during usage.

19. The computer system as claimed in claim 12, wherein in response to the probability of the achievement of the desired reaction being lower than a preset limit value and the desired effect does not change, the file descriptive of the user's reactions is arranged to be compared with said set of possible reactions, based on the reaction impulses included in the rulebase; and as a result of said comparison, an adaptation file is arranged to be created including content parameters of the information object to be presented next to the user, the parameters being specified in such a manner that the probability of the achievement of the desired effect increases.

20. The computer system as claimed in claim 12, wherein in response to the probability of the achievement of the desired reaction being lower than a preset limit value and the desired effect changes, the file of the desired reaction is arranged to be retrieved from the database, the file including linking data for the interaction between each user and each information service content object as specified by the rulebase; and the content of said information service is arranged to be modified for presentation to the user based on said file by deriving the content of the information service to be presented to the user from the desired reaction.

21. The computer system as claimed in claim 12, wherein the information objects included in said information system are arranged to be coded as XML documents.

22. The computer system as claimed in claim 21, wherein said XML documents include a style sheet, such as an XSL style sheet for the appearance of an XML content document, the style sheet including instructions for converting the data included in an XML content document into an HTML document.

* * * * *